United States Patent [19]
Skinner

[11] Patent Number: 5,148,989
[45] Date of Patent: Sep. 22, 1992

[54] INSECT DISPENSING APPARATUS AND METHOD

[76] Inventor: Burr W. Skinner, 10950 SW. 32nd St., Miami, Fla. 33165

[21] Appl. No.: 625,147

[22] Filed: Dec. 10, 1990

[51] Int. Cl.⁵ ............................................. B64D 1/18
[52] U.S. Cl. ........................................ 239/171; 239/8; 239/128; 244/136
[58] Field of Search ........................ 239/1, 8, 128, 171, 239/172; 119/174; 244/136; 222/502, 503, 630; 406/94, 144, 153, 194

[56] References Cited

U.S. PATENT DOCUMENTS

| | | | |
|---|---|---|---|
| 617,425 | 1/1899 | Riley | 222/502 |
| 698,182 | 4/1902 | Drake | 222/503 |
| 1,749,504 | 3/1930 | Pelton | 239/171 |
| 2,364,199 | 12/1944 | Derr | 406/94 |
| 2,597,323 | 5/1952 | Hiller, Jr. et al. | 244/136 |
| 2,836,463 | 5/1958 | Wilson | 239/171 |
| 3,484,062 | 12/1969 | Johnson | 244/136 |
| 4,260,108 | 4/1981 | Maedgen, Jr. | 239/171 |
| 4,537,333 | 8/1985 | Bjerregaard | 222/345 |

Primary Examiner—Andres Kashnikow
Assistant Examiner—Karen B. Merritt
Attorney, Agent, or Firm—Frank L. Kubler; Richard M. Saccocio

[57] ABSTRACT

A dispenser for discharging insects from a moving vehicle includes an insect retaining assembly and an insect acceleration chute. The chute receives air at several locations for accelerating the insects to the speed of the air passing the vehicle. The retaining assembly includes at least one surface for retaining the insects formed from a series of louvers which can be individually rotated on axles to discharge the insects. A metering valve is provided for delivering insects from the retaining assembly to the chute at a constant rate. A refrigeration apparatus is preferably provided for supplying cooled air to the retaining assembly to cool the insects. A method for discharging insects from such a dispenser includes the steps of depositing insects on each retaining surface and rotating the louvers individually at a constant rate to drop the insects from each surface at a constant rate.

24 Claims, 5 Drawing Sheets

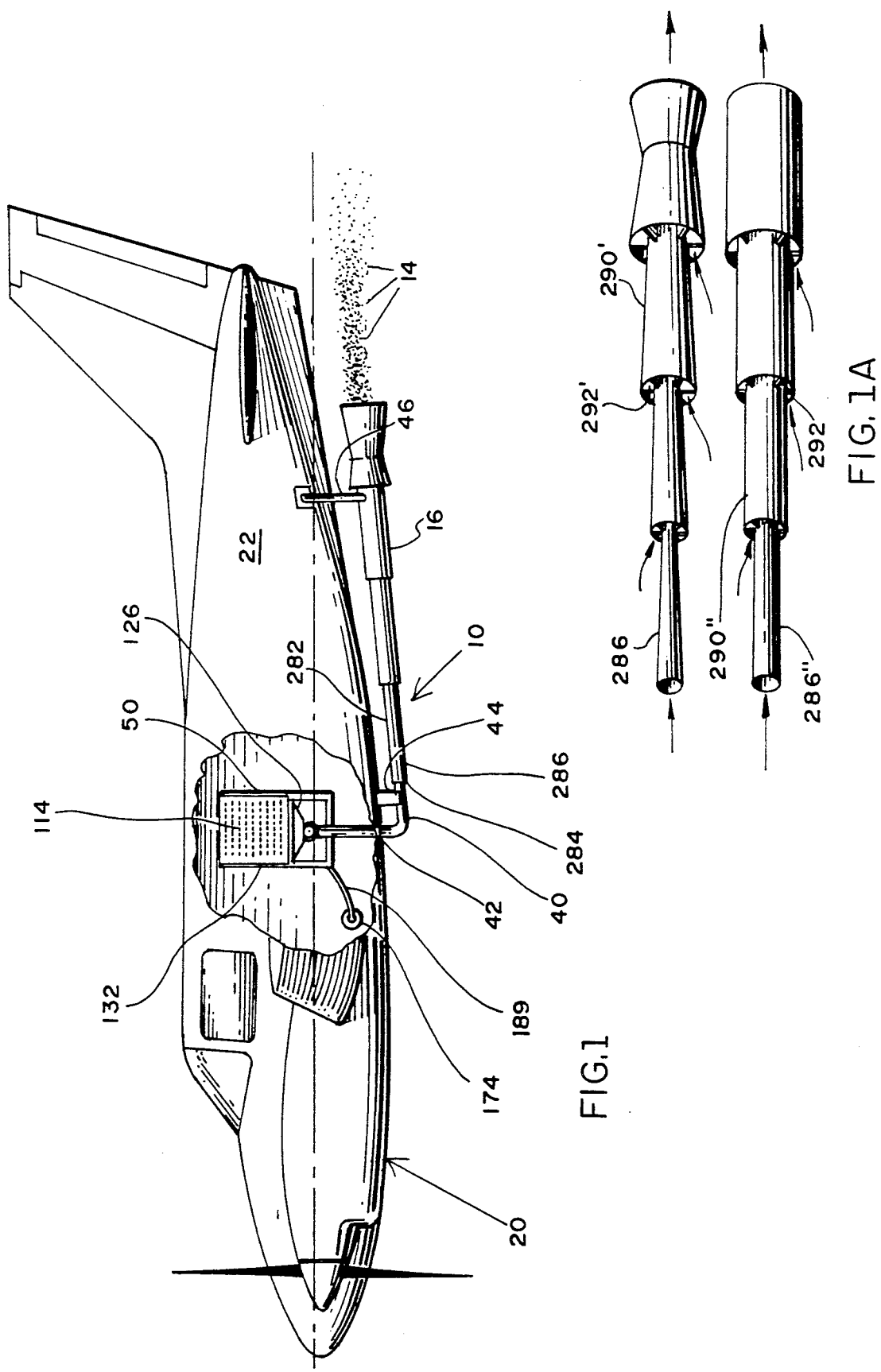

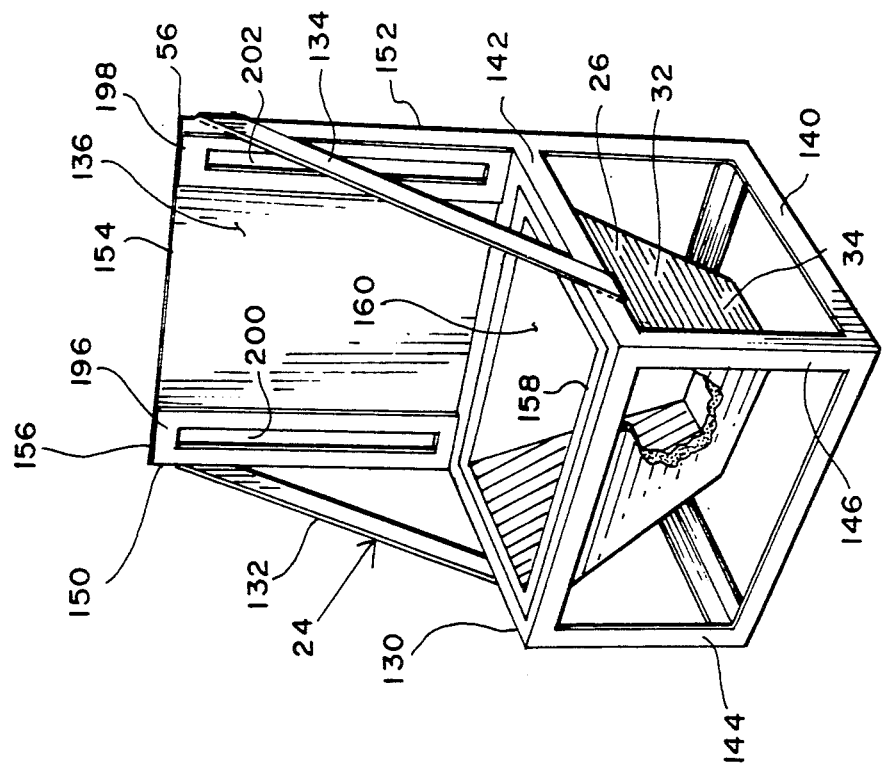
FIG. 6
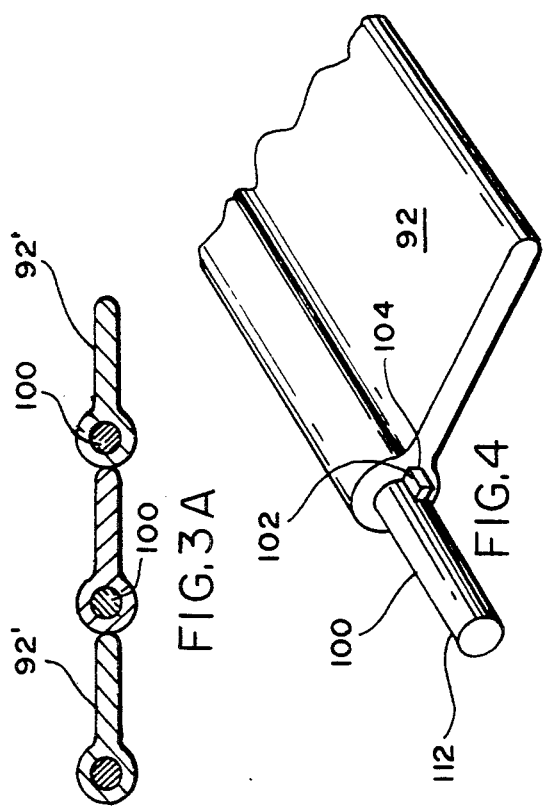
FIG. 3A
FIG. 4
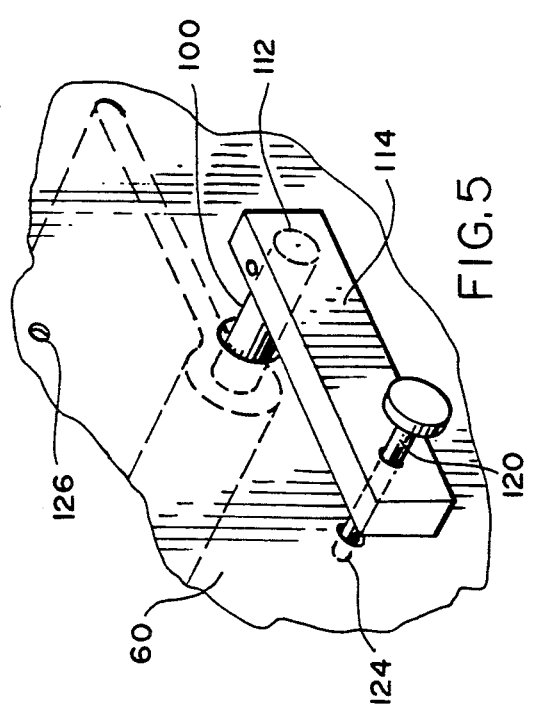
FIG. 5

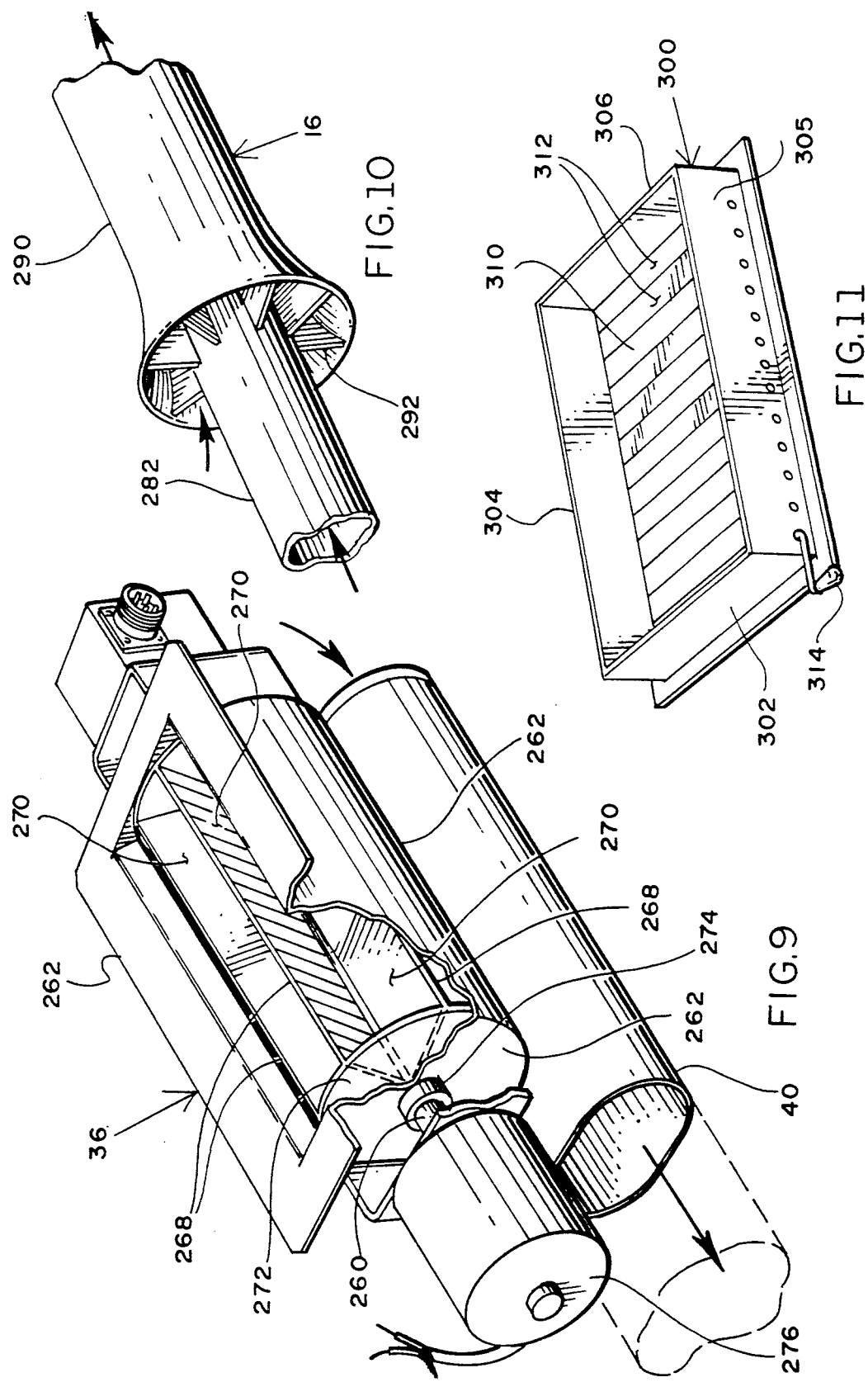

INSECT DISPENSING APPARATUS AND METHOD

BACKGROUND OF THE INVENTION

1. Field of the Invention

The present invention relates generally to the field of insect dispensing, and more specifically to metered dispensing of sterile insects from refrigerated trays through an air-gathering acceleration chute.

2. Description of the Prior Art

It is well known that insects can injure people and destroy their food supplies. Some carry disease or venom toxic to man while others simply destroy livestock or corps. They have also been known to decimate the ranks of endangered animal and plant species valued by man. The cultivation of any animal or plant tends to support an increased population of its natural enemies. In early days, controlled fires were started to drive insects away with smoke and more recently a variety of insecticides such as DDT have been developed. The harmful legacy of these insect poisons is well known today, and the environment has only begun to recover in many areas.

In the aftermath of toxic insecticide damage, an alternative approach has been developed. Insects of any given problem-causing species are collected and bred in large numbers and then sterilized by exposure to certain wavelengths of electromagnetic radiation. The preferred part of the spectrum is x-rays. The sterilized insects are then dispersed into the general insect population over targeted areas. Vast numbers of fertile insects mate with the sterile insects, producing no offspring. As the number of offspring dwindles, so does the targeted insect population. This is an excellent approach because no poisons are released and the environment remains undamaged.

A problem with dispensing sterilized insects is that present dispensing procedures damage many of them, resulting in low efficiency and high cost. Sterile insects are typically carried over fields in airplanes and simply dumped out of cardboard boxes. The high impact of the passing air stuns and tears wings off a large percentage of these insects. Sporadic dumping from boxes also results in little or no uniformity of dispensing. As a result, many more insects must be bred, sterilized and dispensed than are actually needed for a given area.

There are a few aerial dispensing devices in related art which could be used to dispense live insects. Each of these devices has serious disadvantages, however, making them impractical.

The following are examples of such prior art devices.

Johnson U.S. Pat. No. 3,484,062, issued on Dec. 16, 1969, discloses an aerial dispensing apparatus for crop dusting. Powdered or granular material is retained in a hopper having downwardly convergent sidewalls. The material flows through the base of the hopper into rotors with radial blades which meter the flow. From the rotors the material drops into two main air ducts fed by a ram air scoop projecting beneath the fuselage. The air stream carries the material through delivery ducts in the wings and out of the plane through ejector tubes. Small air-gathering tubes referred to as "pick-up diffusers" are located periodically along the delivery ducts in the wings. These tubes inject small amounts of outside air into the ducts, their purpose being to create a swirling effect to diffuse the material throughout the air stream. The ram air design of Johnson causes abrupt acceleration, and when used for insect dispensing rather than crop dusting, the procedure results in insect damage and low efficiency as described above.

More recent and more similar in purpose is Maedgen, U.S. Pat. No. 4,260,108, issued Apr. 7, 1981. Maedgen is designed for dispersing insect eggs. Once again, a hopper having a conical lower portion is disclosed. A metering device is provided at the base of the hopper, taking the form of a perforated plate. This plate is rotated to present an opening of suitable size to permit a desired flow rate. A chute for gathering air and dispersing the eggs is attached beneath the plane. A problem with dispensing insect eggs is that large numbers of them are often destroyed by ants and other predators. A problem with dispensing live insects from Maedgen's chute is that the air stream within the chute which would receive the insects has a higher velocity than the air surrounding the plane. The resulting high air impact would enhance rather than reduce insect damage. Also, the depth to which the insects would have to be piled in the hopper to carry a full load would damage many of them.

Finally, Bjerregaard, U.S. Pat. No. 4,537,333, issued Aug. 27, 1985, is directed to a specific metering rotor arrangement for an airborne particle dispenser. The focus of Bjerregaard is the use of a plate mounted adjacent to the rotor blades to prevent clogging and crushing of particles. Bjerregaard presents no solution to the problems of insect damage caused by deep piling or high air impact.

It is therefore an object of the present invention to provide an insect dispenser which can carry a large quantity of insects without piling them more than two and one-half inches deep.

It is another object of the present invention to provide a dispenser which gently accelerates the insects to the speed of the air passing the delivery vehicle.

It is still another object of the present invention to provide a dispenser which dispenses insects at a constant rate for uniform distribution.

It is finally an object of the present invention to provide a dispenser which can safely and compactly store insects until they are dispensed.

A further object of the present invention is to provide a dispensing apparatus which increases, over the prior art, the efficiency of providing undamaged infertile insects at a ground location by means of an aircraft.

SUMMARY OF THE INVENTION

The present invention accomplishes the above-stated objectives, as well as others, as may be determined by a fair reading and interpretation of the entire specification.

A dispenser is provided for discharging insects from a moving vehicle such as an airplane which includes an insect retaining assembly and a chute for accelerating the insects up to the speed of the airplane so as to eliminate any shock when the insects are released from the chute. The chute receives air at several locations and accelerates the insects to the speed of the air passing the vehicle. The chute preferably gathers insects, supplied by the insect retaining assembly, by the movement of air creating low pressure within the chute, according to the Bernoulli principle. The chute preferably includes a first end communicating with the insect retaining assembly and a plurality of axially aligned tube sections with subsequent tube sections having a diameter larger than a previous tube section each with a diametrical gap between adjacent tube sections. The chute may additionally comprise an exit tube section being shaped to form a Bernoulli tube. The adjacent tube sections are secured together by joining members. The retaining assembly includes at least one surface for retaining the insects formed from a series of louvers which can be rotated on axles to discharge the insects. A metering valve is provided for delivering insects from the retaining assembly to the chute at a constant rate. A refrigeration apparatus is preferably provided for supplying cooled air to the retaining assembly to cool the insects.

A method for discharging insects from such a dispenser is also provided which includes the steps of depositing insects on a retaining surface and rotating louvers individually at a constant rate to drop the insects from the retaining surface at a constant rate. Where multiple insect retaining surfaces are provided, the method also includes the steps of rotating the louvers of the lowest insect retaining surface first and leaving the louvers in a vertical position, and then rotating the louvers of the next highest insect retaining surface so that the insects drop between the louvers of the lowest insect retaining surface.

BRIEF DESCRIPTION OF THE DRAWINGS

Various other objects, advantages, and features of the invention will become apparent to those skilled in the art from the following discussion taken in conjunction with the following drawings, in which:

FIG. 1 is a perspective schematic view of an airplane equipped with one embodiment of the inventive dispensing apparatus. A section of the fuselage is cut away to reveal the portions of the apparatus contained within the airplane. The flared version of the acceleration chute is shown. FIG. 1A shows two non-flared versions of the chute only, the first with tapered tube sections and the second with non-tapered tube sections;

FIG. 3A shows three louvers only in an alternative embodiment where adjacent, closed louvers are slightly separated, but the separation is small enough that insects cannot fall through;

FIG. 4 is a close-up view of one end of an individual retaining surface louver illustrating the embodiment where one edge of the louver wraps around a mounting axle;

FIG. 5 is a close-up view of the end of an axle projecting through the front panel of the compartment housing and its axle lever, lever securing pin, and pin anchoring holes;

FIG. 6 is a perspective view of a compartment support structure and funnel;

FIG. 9 is a perspective view of a metering valve, cut away to reveal its main components;

FIG. 10 is a close-up, perspective view of a section of an acceleration chute showing one embodiment of connecting vanes which join adjacent tubular segments; and, FIG. 11 is a perspective view of the insect loading tray.

DETAILED DESCRIPTION OF THE PREFERRED EMBODIMENTS

Figure 3:
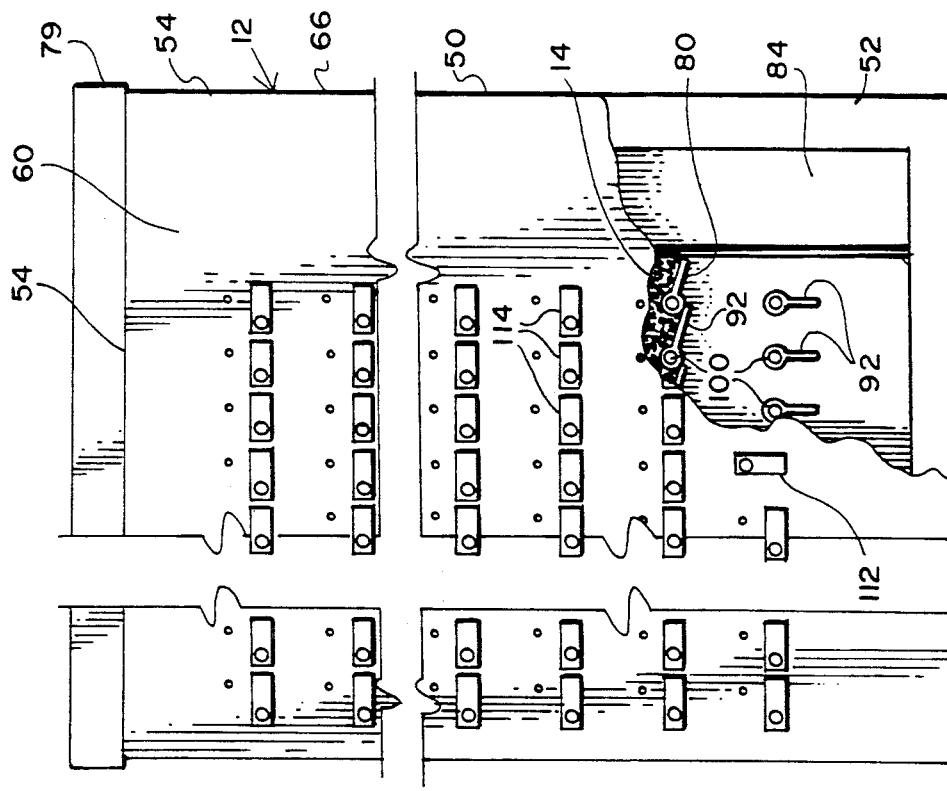
FIG. 3 is a plan view of a compartment housing of FIG. 2 with a section cut away to reveal a portion of two insect retaining surfaces, with two louvers on the lower surface in the open position, and part of an air circulation gap. Adjacent, closed louvers are shown to slightly overlap.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any 10 appropriately detailed structure.

Reference is now made to the drawings, wherein like characteristics and features of the present invention shown in the various figures are designated by the same reference numerals.

FIRST PREFERRED EMBODIMENT

Referring to FIG. 1, a dispenser 10 is disclosed which includes a compartment 12 for retaining insects 14 and an acceleration chute 16 for gently discharging them. Dispenser 10 may be carried in any vehicle but is preferably mounted on a propeller-driven airplane, hereinafter referred to as plane 20.

Figure 2:
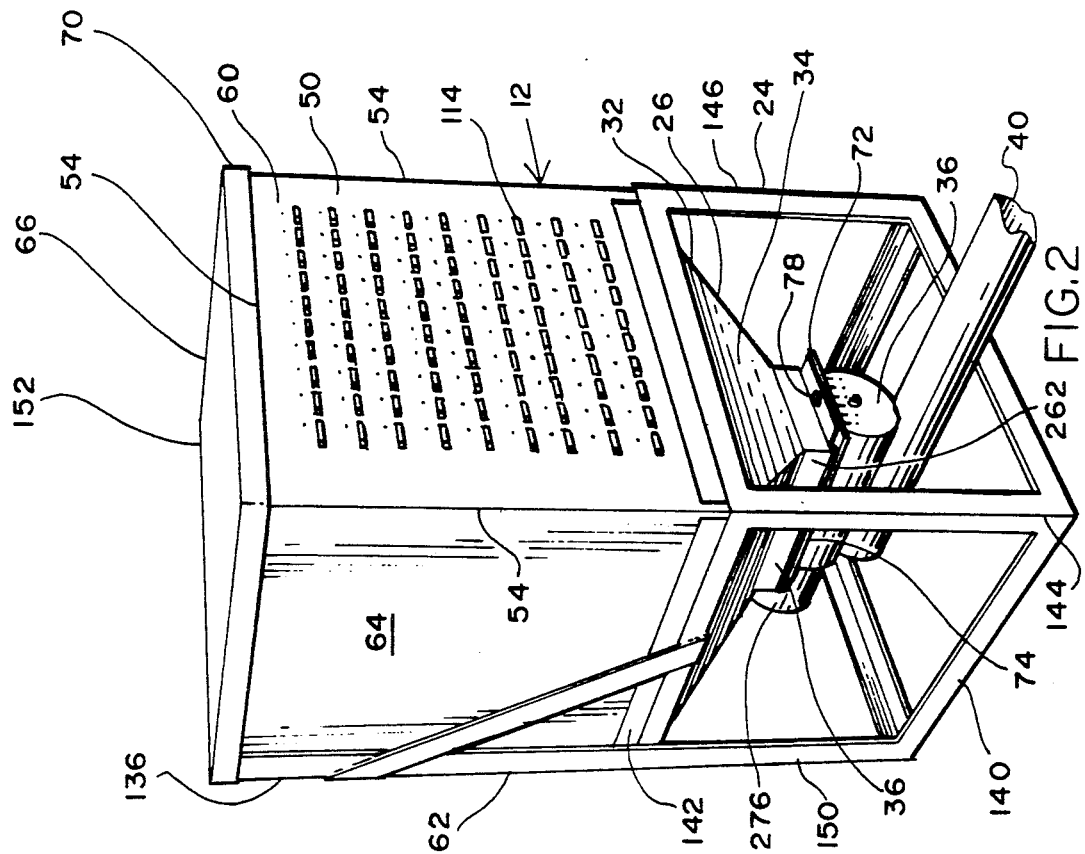
FIG. 2 is a close-up view of one embodiment of an apparatus insect retaining compartment and funnel.

Compartment 12 is preferably contained within the fuselage 22 of plane 20, and is mounted on top of a support structure 24. See FIG. 2. Support structure 24 contains and positions a funnel 26 having a large end 32 and a small end 34. Insects 14 drop from compartment 12 into large end 32. Funnel 26 guides insects 14 into a metering valve 36 located at small end 34. Metering valve 36 deposits insects 14 into a delivery tube 40 gradually and at a constant rate. Tube 40 extends through an opening 42 in the bottom of fuselage 22 and into chute 16. Chute 16 is suspended horizontally from the underside of fuselage 22 with brackets 44 and 46. Air enters chute 16 at several points along its length. Circumferential openings maximize the air flow through chute 16, although openings of other shapes will work. The flow of air within chute 16 reduces its internal pressure to below atmospheric, as a result of the Bernoulli principle. The Bernoulli principle teaches that air pressure at a given point decreases as the velocity of air moving over that point increases, and is commonly observed in Venturi meters and in airplane wing design. The low pressure draws air and insects 14 out of tube 40 and into chute 16. Tube 40 is preferably made of transparent plastic so that the flow of insects within tube 40 can be visually confirmed. The velocity of the air within chute 16 increases at each point where air enters, gradually accelerating insects 14 to the speed of the air passing plane 20. As a result of this gradual acceleration, insects 14 are released unharmed.

Compartment 12 has a double-walled shell, hereinafter referred to as housing 50, preferably made of plastic. Insulation 52, preferably polyfoam, is provided inside the double wall to prevent heat transfer. Prototype testing has shown that a cubical housing 50 of about thirty inches per edge 54 works satisfactorily. Other sizes were also shown to be satisfactory. Housing 50 includes a front panel 60, a rear panel 62, and side panels 64 and 66. See FIG. 3. Front panel 60 has an aluminum outer face. A removable top 70 fits over the upper edges of panels 60, 62, 64 and 66. Funnel 26 latches onto the bottom of housing 50. A removable funnel door 72 slides on tracks 74 and 76 in the small end 34 of funnel 26. Finger hole 78 is provided on funnel door 72 for the user to grasp while sliding bottom panel 72.

Housing 50 contains several horizontal insect-retaining surfaces 80, one above the other. Retaining surfaces 80 extend to meet panels 60 and 62 of housing 50. The vertical distance separating retaining surfaces 80 is about three and one-quarter inches. Nine retaining surfaces 80 are preferably provided within a single compartment 12, although other numbers have been found to work well. Gaps 82 and 84, each of about five inches, are provided between each surface 80 and side panels 64 and 66. Screens 86 and 88, preferably made of stainless steel, separate gaps 82 and 84 from surfaces 80.

Each retaining surface 80 is formed of a series of closed louvers 92, preferably ten louvers 92. Louvers 92 are rectangular, having short edges 94 of about three inches and long edges 96 of sufficient length to span the distance between front panel 60 and rear panel 62. Louvers 92 are preferably made of fiberglass, but may be formed of most plastics, metals or other suitable materials. Long edges of adjacent louvers 92 may slightly overlap when they are closed as shown in FIG. 3. Alternatively, a space may be left between adjacent louvers which is too small for insects 14 to fall through. See FIG. 3A. One long edge 96 of each louver 92 is mounted to an axle 100. Axle 100 is either secured to long edge 96 with fasteners such as rivets, or end 96 wraps around axle 100. See FIG. 4. A key 102 and keyway 104 are provided for the latter arrangement to prevent louver 92 from rotating relative to its axle 100. Axles 100, for any given surface 80, are mutually parallel and co-planar.

Axles 100 extend into rear panel 62 and through front panel 60 of housing 50. Ends 112 of axles 100 project out from front panel 60 and are each fitted with a small, perpendicular lever 114 for rotating individual louvers 92 by hand. Each lever 114 is positioned to match the orientation of its corresponding louver 92. In this way the position of the louvers 92 is always readily apparent. Levers 114 are also preferably of a length equivalent to the width of louvers 92. Louvers 92 may be rotated to a horizontal, or closed, position, or to a downward vertical, or open position. Axles 100 are maintained in the closed position either by spring-biasing or with a securing pin 120 in each lever 114. Securing pin 120 slides through the free end 122 of lever 114. Securing pin 120 enters anchoring hole 124 in front panel 60 for maintaining the closed position or anchoring hole 126 for maintaining the open position. See FIG. 5. Pin 120 is preferably spring-loaded to stay within either anchoring hole 124 or 126.

Support structure 24 includes a seat portion 130, retaining side braces 132 and 134 and a back wall 136. See FIG. 6. Seat portion 130 is preferably made of angled aluminum formed into two parallel squares 140 and 142, one directly above the other. Squares 140 and 142 are separated about 12 inches by front corner members 144 and 146 and rear corner members 150 and 152. Rear corner members 150 and 152 extend vertically about forty-five inches. Back wall 136 is a square panel mounted between corner members 150 and 152, its top edge 154 being level with the top edges 156 of corner members 150 and 152. Side braces 132 and 134 diagonally connect corner members 150 and 152, respectively, with square 142. Funnel 26 is square and sized to drop snugly into top square 142. Funnel lip 158 extends over the top of square 142 to secure funnel 26 in position. Alternatively, funnel 26 is surrounded by its own support structure which rests on seat portion 130. Funnel 26 is thermally insulated, preferably by providing a separate inner funnel 160 with an air space between funnels 26 and 160. The preferred inner funnel 160 material is stainless steel and outer funnel 26 material is plastic and fiberglass.

Compartment 12 is preferably refrigerated. Cooling insects 14 to between 34 and 42 degrees Fahrenheit causes them to stop flying, wrap their wings around themselves, and stop moving. They are thus in an ideal condition for safe and compact storage.

Refrigeration is provided by an evaporator 170 and an air pump 172 mounted on the rear surface 168 of back wall 136, and a remotely located compressor 174 and condenser 176. See FIG. 7. Compressor 174 is powered by an electric motor and connected to a condenser and evaporator 170 by pressure hoses 184. At the entrance to evaporator 170 is an expansion valve 186. Air compressor 174, evaporator 170 and air pump 172 may be of the type used in automobiles and powered by the aircraft 24 volt power supply. A shroud 190 is fastened to the perimeter of rear surface 168 and encloses evaporator 170 and air pump 172. It projects back from rear surface 168 in a shallow cone-shape, contoured to fit into the inner curvature of fuselage 22. Narrow, rectangular doors 192 and 194 are provided near either vertical edge of back wall 136. Doors 192 and 194 are surrounded by gaskets 196 and 198 and communicate with compartment 12 through ports 200 and 202 in the back corners of compartment 12. Ports 200 and 202 extend from the top to the bottom of compartment 12 and correspond in dimensions and location to doors 192 and 194 and gaps 82 and 84. Doors 192 and 194 turn on hinge pins 204 and 206 respectively and preferably are hollow fiberglass or plexiglass, to provide thermal insulation. Refrigerated air exits shroud 190 and enters compartment 12 through entry door 192 and through port 200. It circulates between retaining surfaces 80 and exits through port 202 and re-enters shroud 190 through door 194.

Air pump 172 blows air through shroud 190 from exit door 194 to entry door 192. Encircling air pump 172 and dividing the interior of shroud 190 is a vertical partition 210. Partition 210 permits air to flow through but not beside air pump 172. Evaporator 170 is positioned adjacent to air pump 172 so that moving air must pass over the coils 212 of evaporator 170 and lose heat. On the entry door 192 side of partition 210 are guide slats 214 diverging from air pump 172 which direct the flow of air uniformly through entry door 192. A thermostat located at the center of housing 50 shuts off air pump 172 when the temperature within housing 50 reaches 34 degrees Fahrenheit. As a result of the need for accuracy and the varying altitudes, thermostat 220 is microprocessor controlled.

Figure 8:
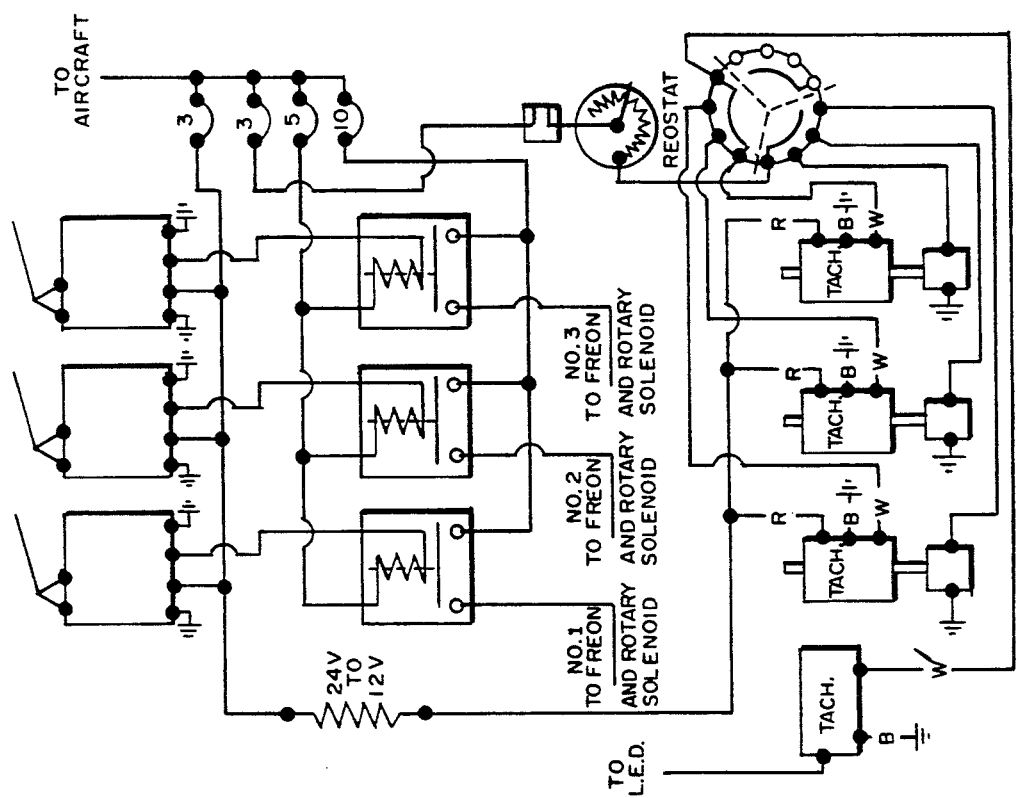
FIG. 8 is a preferred circuit diagram for the second embodiment of the apparatus.
Figure 7:
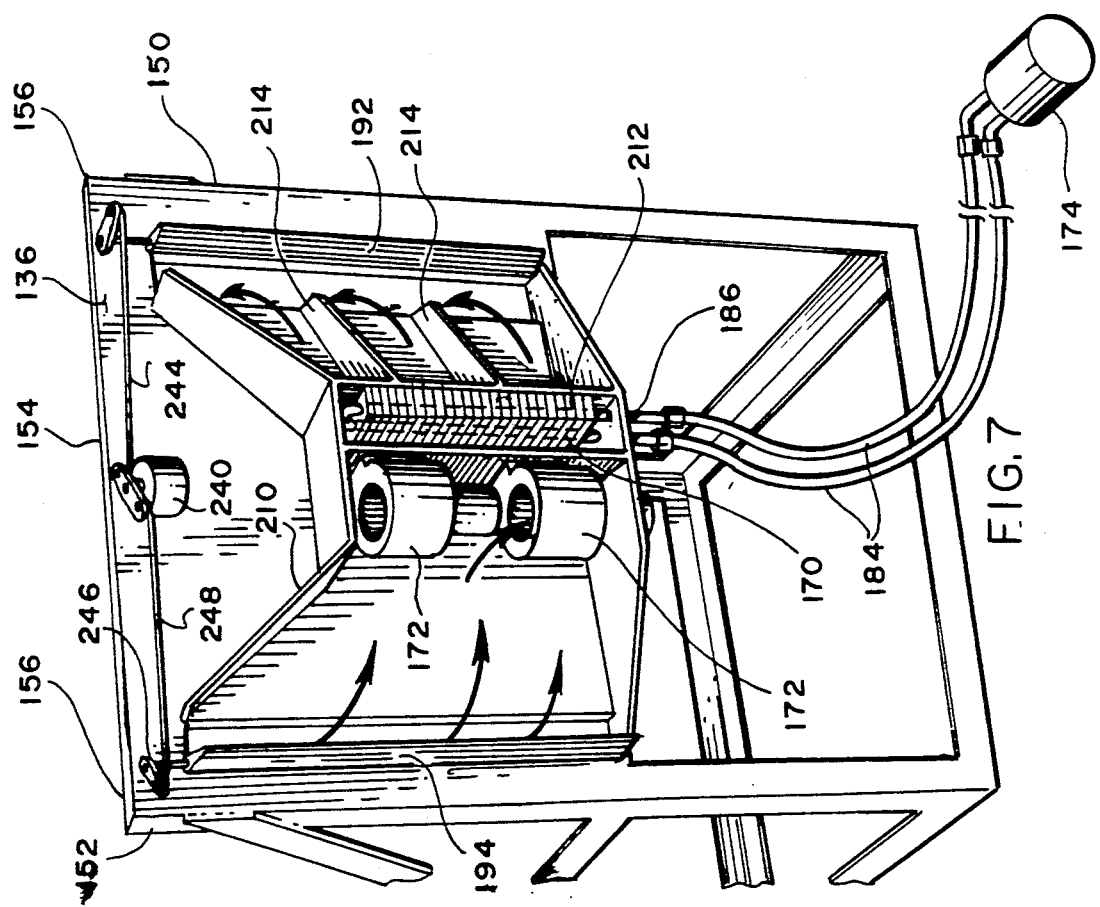
FIG. 7 is a perspective view of refrigeration components for cooling the compartment which are mounted on the rear surface of the support structure back wall.

Air pump 172 is connected in series with a rotary solenoid 240 which simultaneously opens and closes exit door 194 and entry door 192. Linkages 242 and 244 connect solenoid 240 to entry door 192, and linkages 246 and 248 connect solenoid 240 to exit door 194, as shown in FIG. 7. When power is discontinued to air pump 172 it is also discontinued to solenoid 240, and the spring within solenoid 240 pulls them shut. When the temperature within compartment 12 rises above 42 degrees Fahrenheit, thermostat reactivates air pump 172 and rotary solenoid 240 to begin the cooling process again. In this way, an essentially constant temperature is maintained within compartment 12. The preferred circuitry to perform these functions is illustrated in the wiring diagram identified as FIG. 8, but it is understood that many other circuit arrangements may be used.

Metering valve 36 includes and drive shaft 260 mounted axially through a cylindrical housing 262. See FIG. 9. Housing 262 has an insect 14 entrance slot 264 at its top and exit slot 266 at its bottom. Affixed to drive shaft 260 are radially extending vanes or blades 268 essentially equally spaced around the circumference of drive shaft 260. Each blade 268 has a flat, rectangular shape and extends the full length of the interior of cylindrical housing 262. Between blades 268 are sections 270. Circular walls 272 join blades 268 and close the ends of sections 270. Drive shaft 260 is mounted on bearings 274 and is rotated at a constant rate by an electric motor. Metering valve 36 is dimensioned such that when flies are dispensed, each section 270 contains about 720 insects. Drive shaft 260 preferably turns at 4.2 revolutions per minute when plane 20 travels at 160 miles per hour. The rotational speed of the motor may be altered to accommodate different plane 20 speeds and different insect sizes. A tachometer measures the rotational speed of drive shaft 260 for periodic monitoring by the user.

Acceleration chute 16 is made up of a series of co-axial tubular segments 280, each of greater diameter than the adjacent, previous segment 280. See FIG. 1A. Tube 40 opens into the center of the first segment 282. First segment 282 is preferably four to six inches larger in diameter than tube 40 to permit entry of passing air, and is connected to tube 40 with vanes 284. The front end 286 of segment 282 is preferably flared outward to gather additional air as plane 20 moves forward. See FIG. 1. Behind segment 282 is another segment 290 which is preferably four to six inches larger in diameter than first segment 282 and is connected to first segment 282 with vanes 292. See FIG. 10. The leading edge of second segment 290 is also preferably flared outward to gather air. Subsequent tube segments 280 each have a diameter larger than previous tube segments 280 sufficient to form a diametrical gap to receive air. Two or more, and preferably five, of these co-axial, tubular segments 280 form chute 16.

Multiple segments 280 are preferred because each segment 280 can provide just a part of the total acceleration needed to reach the speed of passing air. The result is a continuous, gradual acceleration which is gentle and does not harm insects 14. Each segment 280 of chute 16 is preferably tapered to a cross-section narrower than the segment 280 front opening. See FIG. 1A. This is a feature separate and apart from any flaring of the front edge. The effect of this narrowing is that each segment 280 becomes a venturi, thereby accelerating the speed of the air it contains and lowering its internal pressure. The air and insects from tube 40 or from the previous segment 280 are drawn into the subsequent segment 280 by the low pressure created by the venturi effect. This tapering feature assures that no back pressure forms as a result of the entering air. This effect combines with a ram air effect created by the wide circumferential shape of the gaps between segments 280. The last and widest segment 280 in chute 16 preferably has a broad flare at its back edge to increase the venturi effect and also widely disperse insects 14.

The number of and dimensions of segments 280 must be selected to accommodate a particular vehicle speed, to assure that the speed of dispensed insects 14 matches the speed of the passing air. This selection of chute 16 parameters has been accomplished with trial and error experiments with prototypes of chute 16. Should the desired speed of the dispenser-carrying vehicle be changed, the chute 16 parameters should be altered as well to accommodate the new speed of passing air.

For quickly and easily loading dispenser 10 with insects 14, a loading tray 300 is provided. See FIG. 11. Tray 300 has three to five inch vertical sides 302, 304, 306 and 308, and horizontal dimensions essentially equivalent to those of top 20 of housing 50. The bottom 310 of tray 300 is formed of a series of jalousie-type trap doors 312. Trap doors 312 operate in unison from a single lever 314, just as jalousie windows often operate. The dimensions of a jalousie 312 are close to or the same as those of a louver 92.

METHOD

In practicing the invention, the following method may be used. All louvers 92 forming the lowest surface 80 are closed, and all louvers 92 in the upper surfaces 80 are opened. Insects 14 are piled in tray 300 to a maximum depth of about two and one-half inches. A greater depth is possible but may damage insects 14. The optimal depth may vary from apparatus to apparatus and from insect type to insect type. The optimal depth is determined simply by noting the depth at which some insects become damaged. Lid 70 is removed from compartment 12 and tray 300 positioned in its place. Tray 300 lever 314 is turned to open jalousies 312 and insects 14 fall onto the lowest surface 80. Then all louvers 92 in the second lowest surface 80 are closed. Tray 300 is reloaded and positioned as before and lever 314 turned to drop insects 14 onto the second lowest surface 80. This procedure is repeated until all surfaces 80 are filled with insects 14. Then lid 70 is replaced.

Plane 20 is preferably flown at 160 mph over the target area. Finger hole 78 is grasped by the user and funnel door 72 is slid out of dispenser 10 on tracks 74 and 76. Louvers 92 are opened one at a time with levers 114, at a preferred rate of about one per minute. Louvers 92 are opened in series for one surface 80 at a time, beginning with the lowest surface 80 and progressing upward. In this way, insects 14 from an upper surface 80 drop through the open louvers 92 of lower surfaces 80.

As insects 14 drop from compartment 12 they slide through funnel 26 and into metering valve 36. Metering valve 36 gathers approximate measured numbers of insects 14 in sections 272 and constantly delivers them to tube 40. Moving air within tube 40 carries insects 14 into chute 16 where they are accelerated to the speed of the air passing plane 20 and discharged.

SECOND PREFERRED EMBODIMENT

Several compartments 12, preferably three, are provided in series in fuselage 22. They are all served by one compressor 174. All feed insects into one tube or tube manifold 40 and then into one chute 16.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A dispenser for discharging insects from a moving vehicle comprising insect retaining means for retaining insects aboard said vehicle, delivery means having a delivery means discharge opening, extending from the retaining means into chute means, for delivering the insects into the chute means within an air stream, shield means for shielding the delivery means discharge opening from the direct impact of air passing the vehicle to prevent damage to the insects, wherein the chute means extends from the delivery means discharge opening generally toward the rear of the vehicle and essentially parallel to the longitudinal axis of the vehicle, for containing the air stream flowing out of the delivery means and for gathering a limited quantity of air at at least one axial location for controlled acceleration of the air stream and the insects contained within the air stream to the speed of air passing the vehicle, said acceleration being of a magnitude which does not damage the insects.

2. A dispenser as in claim 1, wherein the delivery means discharge opening is oriented generally toward the rear of the vehicle and in a direction essentially parallel to the longitudinal axis of the vehicle so that the delivery means itself is the shield means for shielding the delivery means discharge opening from the direct impact of the air passing the vehicle.

3. A dispenser as in claim 1 wherein said chute means comprises a plurality of axially aligned tube sections with subsequent tube sections having a diameter larger than a previous tube section, each with a diametrical gap between adjacent tube sections, each diametrical gap constituting one of the axial locations at which a limited quantity of air is gathered.

4. A dispenser as in claim 3 wherein at least one of said tube sections is tapered so that air passing through it accelerates as a result of decreasing cross-sectional area.

5. A dispenser as in claim 3, additionally comprising a chute means exit tube section comprising two ends, each end having an inner diameter, and a middle section having an inner diameter, wherein the inner diameter of the middle section is smaller than the inner diameter of either of the two ends.

6. A dispenser as in claim 3 wherein one or more of said tube sections has a flared edge to aid in gathering air.

7. A dispenser as in claim 1 wherein said retaining means comprise at least one surface for retaining the insects thereon comprising an array of rotatable louvers having a closed position for retaining the insects thereon and an open position for discharging the insects therethrough.

8. A dispenser as in claim 7 additionally comprising axle means with which said louvers rotate.

9. A dispenser as in claim 8 additionally comprising lever means attached to said axle means to aid in rotating said axle means.

10. A dispenser as in claim 7 additionally comprising metering means for delivering insects from the retaining means to said chute means at a constant rate.

11. A dispenser as in claim 10 wherein said metering means comprises a drive shaft with blades extending radially therefrom, a cylindrical housing closely fitting around said blades having an insect entrance port and an insect exit port, and an electric motor for rotating said drive shaft and blades at a constant speed.

12. A dispenser as in claim 11 wherein said electric motor is of adjustable speed and said metering means additionally comprise drive shaft speed measuring means.

13. A dispenser as in claim 10 additionally comprising funnel means for guiding the insects from the retaining means into the metering means.

14. A dispenser as in claim 13 wherein said funnel means comprises two funnels, one placed inside the other with spacing means between said two funnels so that an air space is maintained between the two funnels for providing thermal insulation.

15. A dispenser as in claim 1 additionally comprising refrigeration means for supplying cooled air to the retaining means.

16. A dispenser as in claim 15 wherein the insect retaining means comprises a thermally insulated housing means for containing the insects.

17. A dispenser as in claim 1 additionally comprising a tray comprising jalousie doors upon which the insects are placed which are constructed to open simultaneously and at least one retaining wall, for opening over the retaining means and depositing the insects into the retaining means.

18. A dispenser as in claim 1 for discharging insects additionally comprising retaining means having at least one essentially horizontal surface for retaining the insects formed from a series of louvers which can be rotated to discharge the insects.

19. A method for discharging insects from a dispenser as in claim 1, additionally comprising at least one insect retaining surface formed from an array of rotatable louvers, comprising the steps of:
depositing insects on said louvers, said louvers being in a closed position,
rotating one or more of said louvers to drop the insects from the surface thereof.

20. A method as in claim 19 wherein the dispenser has a plurality of insect retaining surfaces positioned one above the other, comprising the additional steps of:
rotating one or more louvers of the lowest insect retaining surface and leaving the louvers in a vertical position,
rotating one or more louvers of the next highest insect retaining surface so that the insects drop between the louvers of the lowest insect retaining surface.

21. A method as in claim 19 including the step of rotating said one or more louvers individually and at a constant rate to drop said insects at a constant rate.

22. A method as in claim 19 wherein the dispenser has an insect loading tray having at least one vertical wall for retaining the insects and a bottom formed of a plurality of jalousies, comprising the additional steps of:
placing the insect loading tray over the insect retaining surface,
opening the jalousies simultaneously to drop the insects from the insect retaining tray onto the insect retaining surface to achieve an essentially uniform distribution of insects on the retaining surface.

23. A dispenser for discharging insects from a moving vehicle comprising insect retaining means for retaining insects aboard said vehicle and chute means which receives air at at least one axial location along the length of the chute means for accelerating the insects to the speed of air passing the vehicle, wherein said retaining means comprise at least one surface for retaining the insects thereon comprising an array of rotatable louvers having a closed position for retaining the insects thereon and an open position for discharging the insects therethrough, metering means for delivering insects from the retaining means to the chute means at a constant rate, funnel means for guiding the insects from the retaining means into the metering means, wherein the funnel means comprises two funnels, one placed inside the other with spacing means between said two funnels so that an air space is maintained between the two funnels for providing thermal insulation.

24. A dispenser for discharging insects from a moving vehicle comprising insect retaining means for retaining insects aboard said vehicle and chute means which receives air at at least one axial location along the length of the chute means for accelerating the insects to the speed of air passing the vehicle, metering means for delivering insects from the retaining means to the chute means at a constant rate, and refrigeration means for supplying cooled air to the retaining means.

* * * * *